March 28, 1950  B. N. ASHTON ET AL  2,502,118
VALVE FOR HYDRAULIC BRAKE SYSTEMS
Filed June 23, 1948
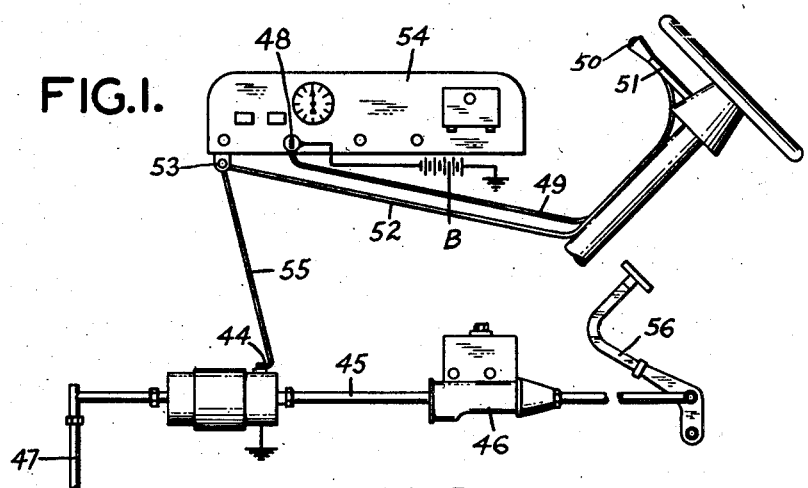
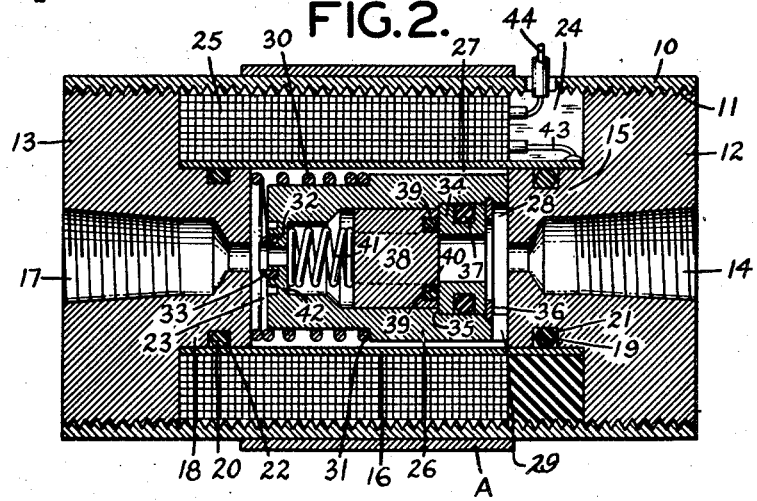
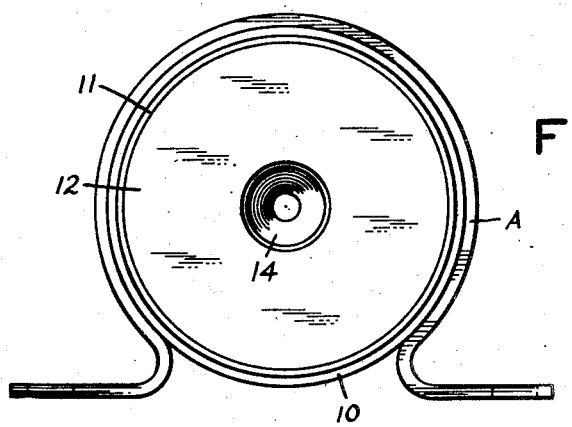
INVENTORS
BENJAMIN N. ASHTON
EUGENE V. BARKOW
BY
THEIR ATTORNEYS Patented Mar. 28, 1950

2,502,118

UNITED STATES PATENT OFFICE 2,502,118

VALVE FOR HYDRAULIC BRAKE SYSTEMS

Benjamin N. Ashton and Eugene V. Barkow, Kingston, N. Y., assignors to Electrol Incorporated, Kingston, N. Y., a corporation of Delaware Application June 23, 1948, Serial No. 34,703

2 Claims. (Cl. 137—144)

This invention relates to improvements in control valves for hydraulic systems, and it relates particularly to valves for use in hydraulic brake systems whereby the brakes may be set and retained in a set condition by the manual operation of a switch to prevent the vehicle from creeping or moving when stopped on a hill or incline.

Control valves of the type generally described above have been provided heretofore but they have not been particularly successful or used to any great extent in vehicles because of certain operating difficulties. Some of these valves are so constructed that they depend in part upon gravity for operation and positioning of the valve elements, and, therefore, they must be installed in a set position in the vehicle and are susceptible to some lag in operation when the vehicle is on a steep incline.

Valves of the type embodying the present invention are so arranged and constructed that their position in the vehicle is immaterial, and, therefore, the inclination or position of the vehicle does not in any way affect the operation of the valve. Moreover, the new valves are so arranged that they can be more readily installed in the hydraulic system than the prior types of valves.

A typical form of valve embodying the present invention is characterized by a generally cylindrical casing having inlet and outlet ports at its opposite ends so that the valve can be inserted in the hydraulic line running from the master brake cylinder to the brake actuating cylinders by merely cutting the hydraulic line and coupling the cut ends to the ends of the valve casing. The inclination of the line and the valve is unimportant. The valve is provided with an enlarged chamber between the inlet and outlet port which is encircled by a solenoid winding and receives the armature of the solenoid. The armature is of such construction that while it is guided for reciprocatory movement in the chamber, the liquid can flow from the inlet port to the outlet port past the armature and vice versa, so long as the solenoid is not energized. When the solenoid winding is energized, the armature is urged toward the outlet port, where, because of the provision of a sealing ring or valve element on the end of the armature, communication between the inlet port and the outlet port is cut off. Thus, if the brakes on the vehicle have been actuated to stop the vehicle and the solenoid is energized, reverse flow of the liquid from the brake actuating cylinders to the master brake cylinder cannot take place. However, additional pressure may be supplied to the brakes if necessary by the provision of a passage through the armature which contains a check valve permitting flow of liquid from the inlet to the outlet port and preventing reverse flow.

Upon deenergizing the solenoid, the armature is urged toward the inlet port, thereby permitting liquid to flow from the outlet port around the armature to the inlet port and thence to the master brake cylinder. By properly proportioning the area of the passage or passages around the armature, controlled release of pressure in the brake actuating cylinders is obtained so that the brakes are released without substantial hydraulic shock in the system.

For a better understanding of the present invention, reference may be had to the accompanying drawing, in which:

Fig. 1 is a diagrammatic illustration of a typical installation including the new form of control valve;

Fig. 2 is a view in longitudinal section through the control valve; and

Fig. 3 is an end view of the valve looking toward the inlet port and illustrating a supporting bracket for the valve.

As shown particularly in Figs. 2 and 3, a typical form of control valve embodying the invention may consist of a valve casing made up of a cylindrical sleeve 10 having internal threads 11 therein for engagement with threaded end plugs 12 and 13. The end plug 12 is provided with an inlet port 14 which may be suitably threaded to receive a threaded coupling and is provided with an inwardly projecting boss 15 of generally cylindrical shape for supporting a tubular liner 16. The opposite end plug 13 is provided with a threaded discharge port 17 and also has a cylindrical boss 18 thereon for receiving the opposite end of the liner 16. Leakage between the bosses 15 and 18 and the sleeve or liner 16 is prevented by means of suitable rubbery sealing rings 19 and 20 which are mounted in grooves 21 and 22 in the sides of the bosses 15 and 18, respectively.

The sleeve 16 is formed of non-magnetic material and defines the outer wall of a chamber 23 and the inner wall of a chamber 24. Mounted in the chamber 24 is a solenoid winding 25. This winding may consist of a relatively small number of turns of fairly heavy wire.

Mounted within the chamber 23 is the armature 26 which preferably is non-circular in exterior cross-section in order to provide passages or gaps 27 between the armature 26 and the sleeve 16. The armature 26 further is provided with a central bore 28 for a purpose to be described and radial notches 29 in its right-hand end so that liquid can flow from the inlet port 14 through the notches 29, the passages 27, around the left-hand end of the armature and out through the outlet port 17, or vice versa when the armature is in the position shown in Fig. 2. The armature 26 is normally retained in the position shown in Fig. 2 by means of a coil spring 30 which bears at its left-hand end against the face of the cylindrical portion 18 and at its right-hand end against a shoulder 31 formed on the armature.

The armature is further provided with at least one end groove 32 adjacent the outlet port 17 for receiving a rubber gasket 33 of greater internal diameter than the external diameter of the portion of the outlet port 17 adjacent thereto. This gasket 33 acts as a valve to prevent flow of liquid between the inlet and outlet ports through the passages 27 when the armature is displaced to the left by energization of the coil 25.

The opening or bore 28 in the armature contains a check valve which permits the flow of liquid from the inlet port 14 to the outlet port 17 regardless of the position of the armature 26. The check valve may suitably include an annular ring member 34 forming the valve seat which is retained against a shoulder 35 in the bore 28 by means of a snap ring 36. A suitable ring seal 37 is provided for preventing leakage around the outside of the ring 34. The cooperating valve plug 38 may be a piece of metal of generally non-circular cross-section having edges bearing against the wall of the bore 28 for guidance but permitting flow of liquid therearound when the plug 38 is displaced to the left. To provide an adequate liquid seal, the right-hand end of the plug 38 is provided with a groove 39 in which is mounted a rubbery ring 40 that bears against the left-hand face of the ring 34 and effects a seal therewith. The plug 38 is normally urged against the ring 34 by means of a coil spring 41 interposed between the left-hand end of the plug 34 and a flange 42 extending inwardly at the left-hand end of the armature.

In the form of the invention illustrated, one terminal 43 of the solenoid coil may be grounded and the other terminal 44 may be connected in the electrical circuit as described hereinafter. The valve as a whole may be supported in any convenient position in the vehicle by means of a ring type bracket A so that the inlet and outlet ports may be connected in the pressure line 45, as shown in Fig. 1 between the master brake cylinder 46 and the conduit 47 or conduits leading to the brake actuating cylinders. Fig. 1 also shows the manner in which the electrical connections are made for energizing solenoid. As shown in this figure, the vehicle battery B may be connected to the ignition switch 48 and to ground and a single conductor 49 leads from the ignition switch to a suitable switch 50 mounted on the end of the gear shaft lever 51. The switch 50 may be of the single-throw, single pole type so that movement in one direction closes it and movement in the opposite direction opens the switch. The opposite terminal of the switch 50 from the conductor 49 is connected by means of a suitable conductor 52 to a dial light 53 mounted on the instrument panel 54 and by another conductor 55 to the terminal 44. Inasmuch as the opposite terminal of the battery is grounded and the terminal 43 of the coil 25 is grounded, the solenoid coil 25 is energized when the switch 50 is closed and the coil is deenergized when the switch 50 is open.

In operation, with the solenoid 25 deenergized, the various elements of the control valve will be in the position shown in Fig. 2. When the brake pedal 56 is depressed, pressure from the brake cylinder 46 is delivered through the conduit 45 to the inlet port 14 of the valve through the passages 27 and also through the bore 28 in the armature to the outlet port 17 and to the brake actuating cylinders through the conduit 47. Upon release of the brake pedal, liquid will flow back through the outlet port 17, the passages 27 and through the inlet port 14 to the master brake cylinder 46.

If it is desired to set the brakes, the brake pedal 56 may be depressed and the brake actuating cylinders will be energized, as described above. If the switch 50 on the gear shift lever is closed to energize the solenoid 25, the armature 26 is urged to the left, thereby engaging the sealing ring 33 with the end of the chamber and preventing reverse flow of the liquid from the outlet passage to the inlet passage. In this position, the pressure in the brake actuating cylinders is maintained and the brakes remain set until the switch 50 is opened.

If some leakage should occur with the gradual release of the brakes when the solenoid is energized, additional pressure can be supplied to the brake actuating cylinders by again actuating the pedal 56 inasmuch as the check valve plug 38 will then be displaced from its seat permitting flow of liquid through the passage 28 in the armature into the outlet port 27 and to the brake actuating cylinder. It will be understood that the brakes can be actuated even if the switch 50 is closed but they will not release unless the switch 50 is open.

From the preceding description, it will be apparent that we have provided a control valve of simple, yet highly efficient nature which can be readily installed in the hydraulic braking system of a vehicle and in any convenient position.

It will be understood that the configuration of various elements of the valve may be modified considerably and that different materials than those referred to may be used therein. Moreover, the device may be used in other systems than hydraulic brake systems. Accordingly, the form of the invention described herein should be considered as illustrative and not as limiting the scope of the following claims.

We claim:

1. A valve for controlling hydraulic equipment comprising a casing having inlet and outlet ports at opposite ends and an enlarged chamber between its ends, communicating with said ports, a solenoid winding on said casing around said chamber, an armature in and movable axially of said chamber and having a passage extending from end to end of the armature lengthwise of said chamber, means providing at least one passage from said inlet port to said outlet port around said armature, valve means on the end of said armature adjacent to said outlet port engageable with said end of said chamber adjacent to said outlet port, upon energization of said solenoid, to prevent flow of liquid from said outlet port around said armature to said inlet port, spring means normally urging said armature toward said inlet port to disengage said valve means from the end of the chamber adjacent to said outlet port, and a check valve in the passage through said armature permitting flow of liquid through the passage in the armature from said inlet port to said outlet port and preventing flow of liquid from said outlet port to said inlet port through the passage in said armature.

2. A control valve for hydraulic brake systems comprising a valve casing, a hollow solenoid winding in said casing, a chamber in said casing inside said winding, said casing having inlet and outlet ports at opposite ends communicating with opposite ends of said chamber, an armature in and slidable lengthwise of said chamber, said armature have a bore extending lengthwise through it, means forming at least one passage between said armature and said chamber connecting said inlet and outlet ports, an annular valve member encircling the bore at one end of said armature and movable with said armature into engagement with the end of the chamber around said outlet port to prevent flow of liquid through said passage upon energization of said solenoid while maintaining communication between said outlet port and said bore, spring means urging said armature toward said inlet port to disengage said valve member from the end of said chamber adjacent to said outlet port, and a check valve in said bore to prevent flow of liquid from said outlet port to said inlet port through said bore.

BENJAMIN N. ASHTON.
EUGENE V. BARKOW.

REFERENCES CITED

The following references are of record in the file of this patent:

UNITED STATES PATENTS

| Number | Name | Date |
| --- | --- | --- |
| 2,133,538 | Darling | Oct. 18, 1938 |
| 2,217,141 | Sprenkle | Oct. 8, 1940 |
| 2,262,842 | Goepfrich | Nov. 18, 1941 |
| 2,296,132 | Wiseley | Sept. 15, 1942 |
| 2,391,017 | Grontkowski | Dec. 18, 1945 |
| 2,391,129 | Chambers | Dec. 18, 1945 |

FOREIGN PATENTS

| Number | Country | Date |
| --- | --- | --- |
| 557,981 | Great Britain | Dec. 14, 1943 |